United States Patent
Huang et al.

(10) Patent No.: US 11,101,965 B2
(45) Date of Patent: Aug. 24, 2021

(54) HANDLING NULL A-CSI REPORT OVERLAP WITH OTHER UPLINK TRANSMISSIONS

(71) Applicant: QUALCOMM Incorporated, San Diego, CA (US)

(72) Inventors: Yi Huang, San Diego, CA (US); Amir Aminzadeh Gohari, Sunnyvale, CA (US); Gokul Sridharan, Sunnyvale, CA (US); Wei Yang, San Diego, CA (US); Chun-Hao Hsu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/596,655

(22) Filed: Oct. 8, 2019

(65) Prior Publication Data

US 2020/0112415 A1  Apr. 9, 2020

Related U.S. Application Data

(60) Provisional application No. 62/743,508, filed on Oct. 9, 2018.

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1887* (2013.01); *H04L 5/0051* (2013.01);
(Continued)

(58) Field of Classification Search
CPC ... H04L 5/0055; H04L 5/0051; H04L 1/1887; H04L 5/0053; H04L 1/1671;
(Continued)

(56) References Cited

FOREIGN PATENT DOCUMENTS

| WO | 2018031727 A1 | 2/2018 | |
|---|---|---|---|
| WO | WO-2018031727 A1 * | 2/2018 | ........... H04L 5/0094 |

OTHER PUBLICATIONS

Lin, Xingqin, et al. "5G new radio: Unveiling the essentials of the next generation wireless access technology." IEEE Communications Standards Magazine 3.3 (2019): 30-37. (Year: 2019).*

(Continued)

*Primary Examiner* — Sharad Rampuria
(74) *Attorney, Agent, or Firm* — Procopio, Cory, Hargreaves & Savitch LLP

(57) ABSTRACT

The present disclosure relates to methods and devices for communication which may include a user equipment (UE) and a base station. In one aspect, the UE may receive a trigger to measure an uplink Aperiodic Channel State Information Reference Signal (A-CSI-RS). The UE may also receive an allocation of a first resource for an uplink shared channel. Additionally, the UE can receive at least one indication for an A-CSI report to comprise a null A-CSI report. Moreover, the UE can determine whether to alter another uplink transmission. In some aspects, this determination can be based, at least in part, on whether the first resource allocated for the uplink channel overlaps in time with a second resource for the other uplink transmission.

31 Claims, 11 Drawing Sheets

(52) U.S. Cl.
CPC ....... *H04L 5/0053* (2013.01); *H04W 72/0413* (2013.01); *H04W 72/0446* (2013.01)

(58) Field of Classification Search
CPC ... H04L 5/0091; H04L 5/0048; H04L 1/1812; H04L 5/0044; H04L 5/0057; H04W 72/0413; H04W 72/0446; H04B 7/2618
See application file for complete search history.

(56) References Cited

OTHER PUBLICATIONS

Nam, Young-Han, et al. "Evolution of reference signals for LTE-advanced systems." IEEE Communications Magazine 50.2 (2012): 132-138. (Year: 2012).*
Huawei, et al., "Discussion on Efficient Utilization of BF CSI-RS", 3GPP TSG RAN WG1 Meeting #85, 3GPP Draft; R1-164858, vol. RAN WG1, No. Nanjing, China; May 23, 2016-May 27, 2016, May 14, 2016 (May 14, 2016), 4 Pages, XP051096294, URL: http://www.3gpp.org/ftp/tsg_ran/WG1_RL1/TSGR1_85/Docs/ [retrieved on May 14, 2016] Sections 1-3.
International Search Report and Written Opinion—PCT/US2019/055414—ISA/EPO—dated Jan. 27, 2020 (190026WO).
VIVO: "Maintenance for CSI Acquisition", 3GPP TSG RAN WG1 #94bis, 3GPP Draft; R1-1810365, vol. RAN WG1, No. Chengdu, China; Oct. 8, 2018-Oct. 12, 2018, Sep. 29, 2018 (Sep. 29, 2018), 7 Pages, XP051517774, URL: http://www.3gpp.org/ftp/tsg%5Fran/WG1%5FRL1/TSGR1%5F94b/Docs/R1%2D1810365%2Ezip [retrieved on Sep. 29, 2018] Sections 1-5.
David J. Kappos "Subject Matter Eligibility of Computer Readable Media" dated Feb. 23, 2010.

* cited by examiner

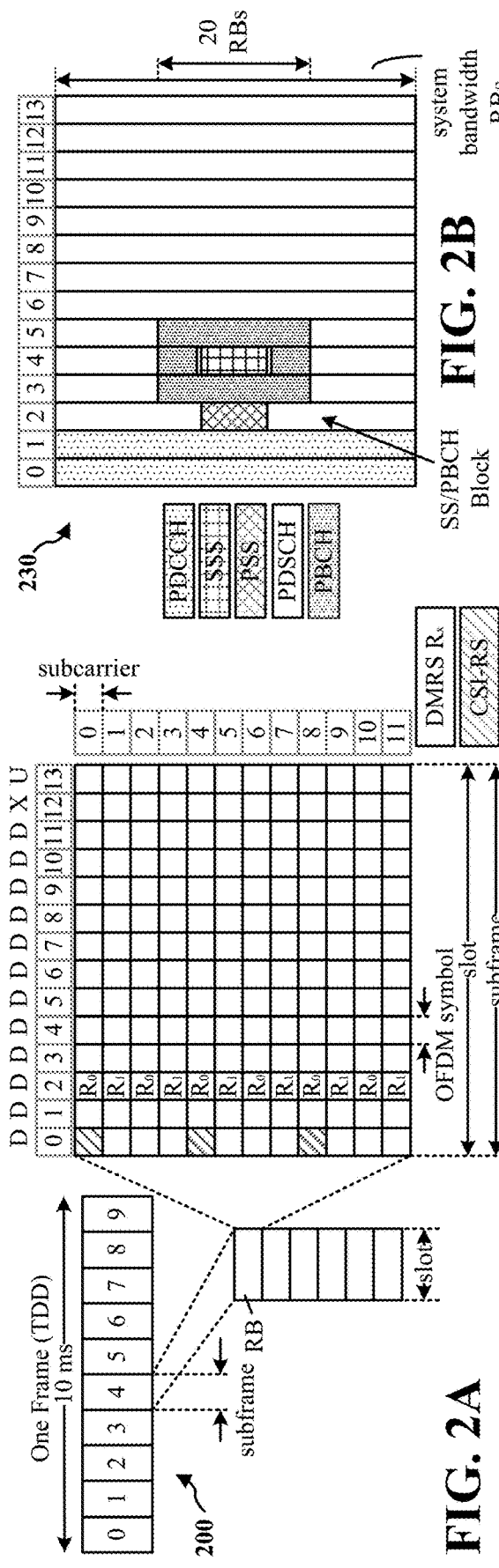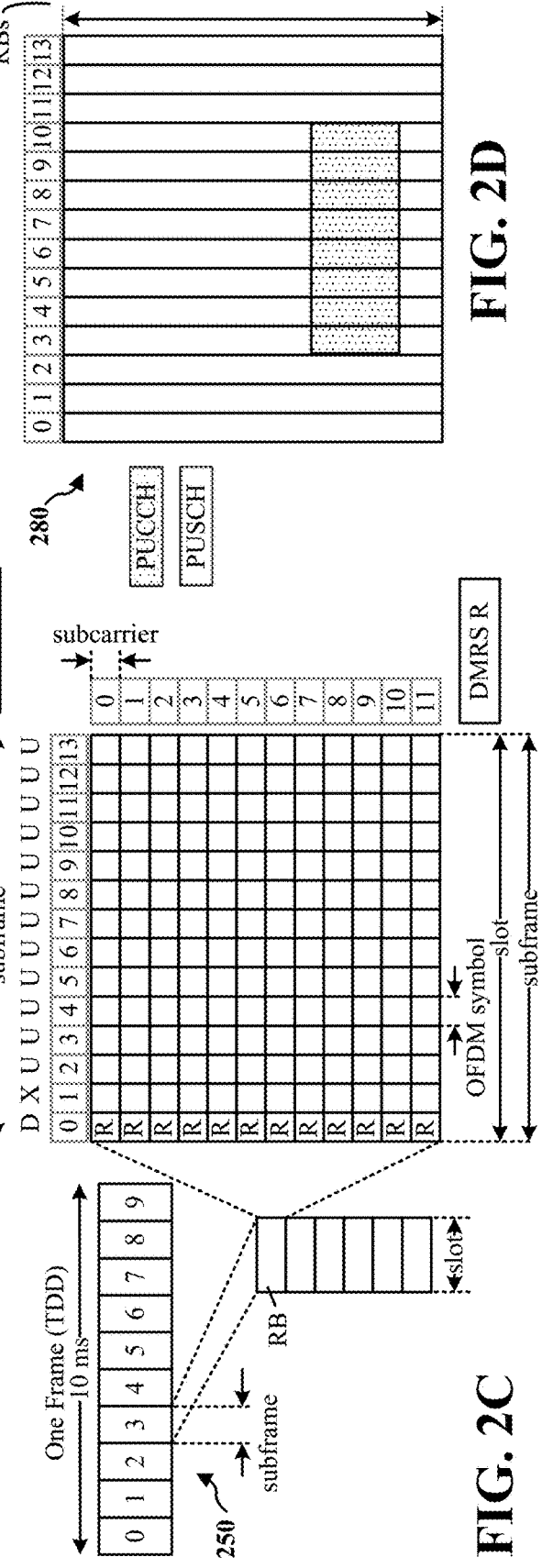
FIG. 2A  FIG. 2B  FIG. 2C  FIG. 2D

HANDLING NULL A-CSI REPORT OVERLAP WITH OTHER UPLINK TRANSMISSIONS

CROSS REFERENCE TO RELATED APPLICATION(S)

This application claims the benefit of U.S. Provisional Application Ser. No. 62/743,508, entitled "HANDLING NULL A-CSI REPORT OVERLAP WITH OTHER UPLINK TRANSMISSIONS" and filed on Oct. 9, 2018, which is expressly incorporated by reference herein in its entirety.

INTRODUCTION

The present disclosure relates generally to communication methods and systems, and more particularly, to methods and apparatus related to uplink transmission procedures in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In one aspect, the UE may receive a trigger to measure an uplink aperiodic Channel State Information Reference Signal (A-CSI-RS). The UE may also receive an allocation of a first resource for an uplink shared channel. Additionally, the UE can receive a first indication that no uplink data transmission is requested from the UE and a second indication for a null A-CSI report. In some aspects, if the first resource allocated for the uplink shared channel overlaps a second resource for the other uplink transmission from the UE in time, the UE can disregard the first resource allocated for the uplink shared channel. Additionally, in some aspects, the UE may not transmit the uplink shared channel indicated in downlink control information (DCI).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
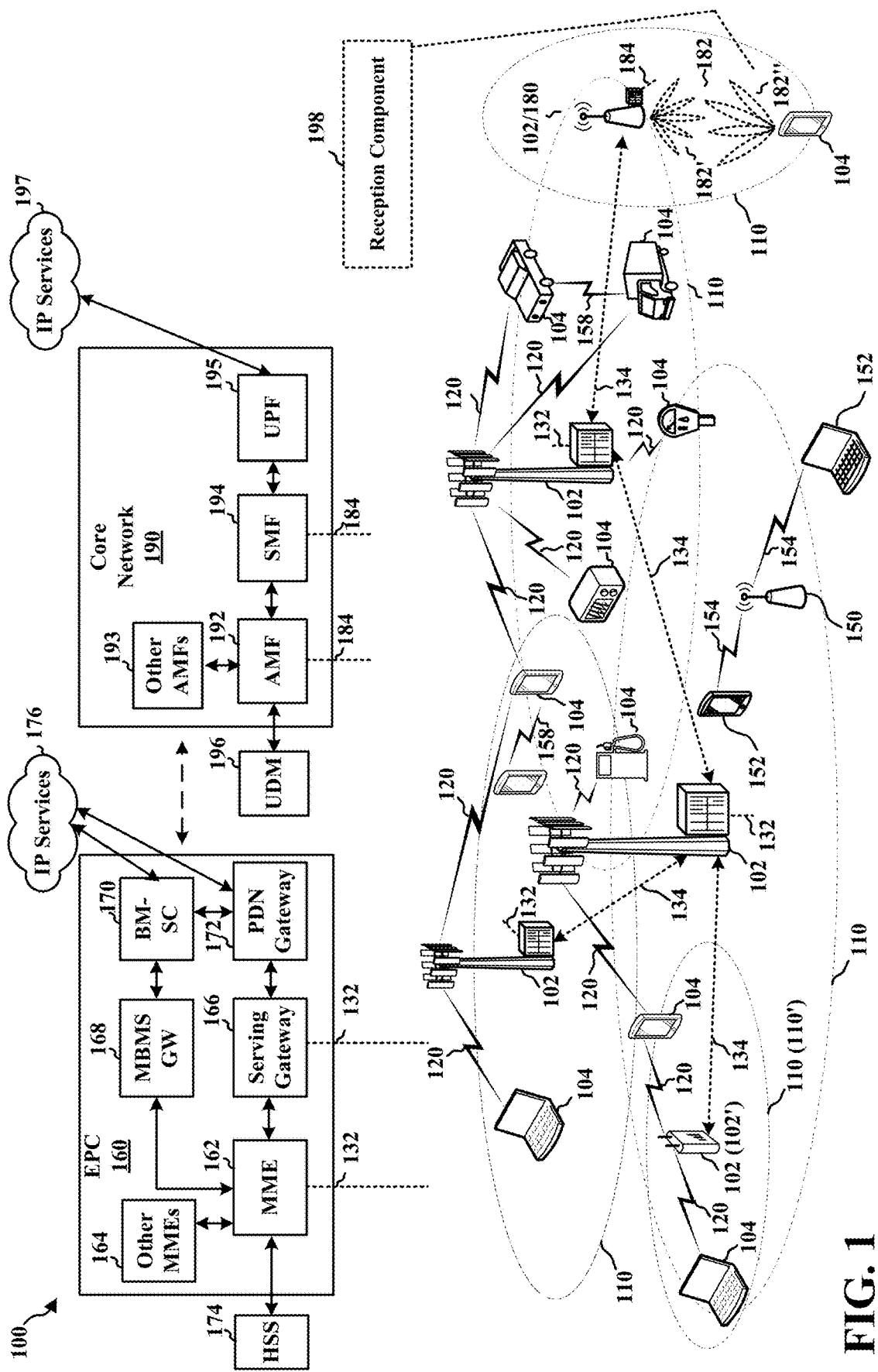
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be comprise a reception component 198 configured to receive a trigger to measure an Aperiodic Channel State Information Reference Signal (A-CSI-RS). Reception component 198 can also be configured to receive an allocation of a first resource for an uplink shared channel. Further, reception component 198 can be configured to receive a first indication that no uplink data transmission is requested from the UE. Reception component 198 can also be configured to receive a second indication for a null A-CSI report.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
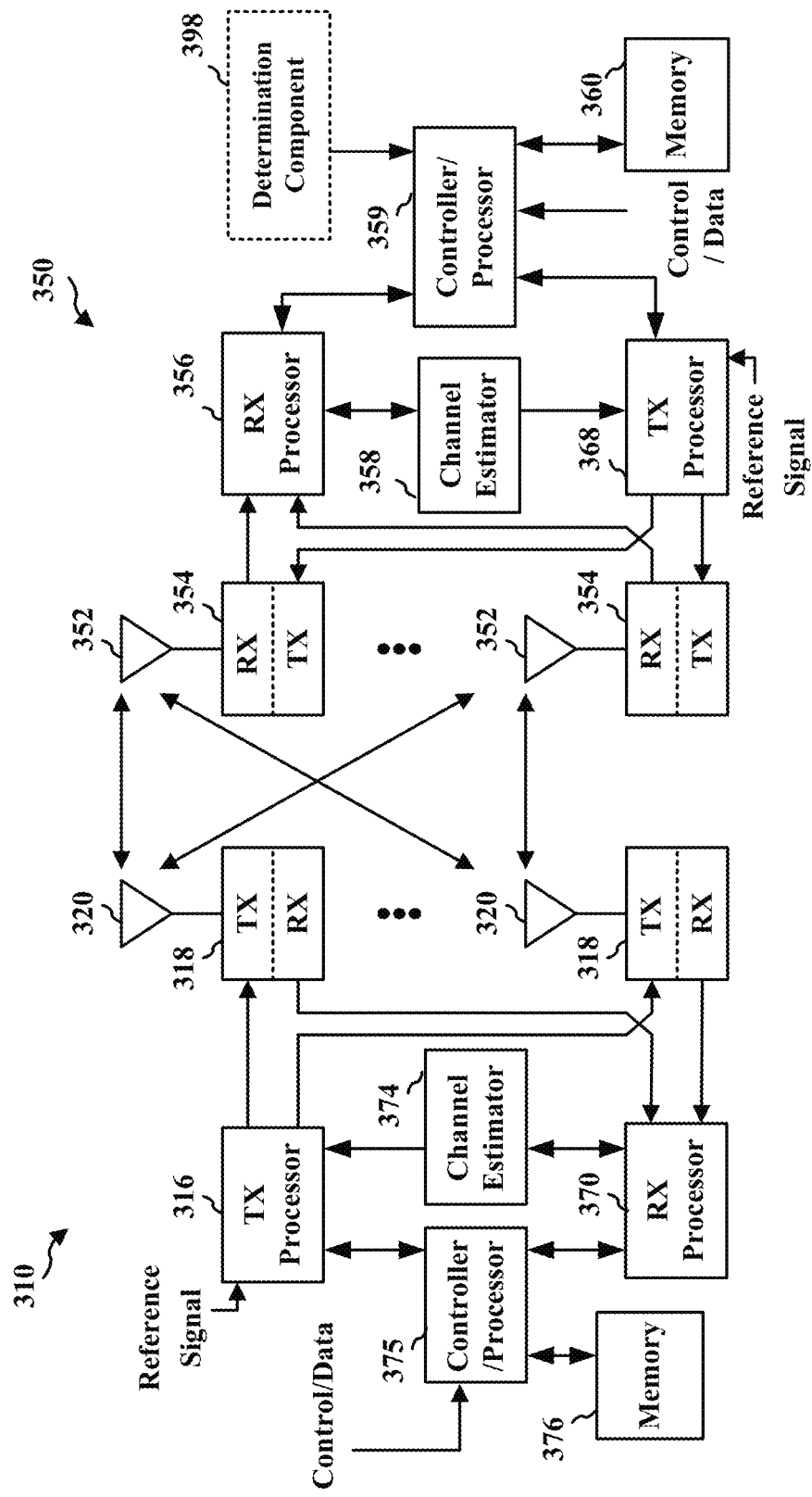
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Some aspects according to the present disclosure can include a UE that can be in a network and be connected to a certain base station, such as a gNB. The UE can receive uplink DCI from the base station. In some aspects, the DCI may trigger the UE to measure an A-CSI reference signal (A-CSI-RS) and allocate PUSCH resources while informing the UE that there is no data being requested from the UE and no CSI report for the A-CSI-RS is required from the UE. While a trigger to measure A-CSI-RS may trigger a channel state information (CSI) report from the UE, the UE may instead transmit a dummy/null A-CSI report, e.g., when the UE is asked to monitor certain measurements or transmissions, but not send a report on these measurements or transmissions.

In some aspects of the present disclosure the base station may trigger the UE to monitor an A-CSI reference signal (A-CSI-RS) with no requirement to transmit a subsequent CSI report, i.e., the report quantity value can be set to none or zero. In some aspects, the base station can trigger the UE to monitor the A-CSI-RS for certain beam refinement, e.g., P3 reception beam refinement. For example, P3 beam refinement can include UE receiver beam refinement or transmit beam refinement assuming channel reciprocity. In other aspects, the base station can trigger the UE to monitor an aperiodic tracking reference signal (TRS) for a tracking loop. The UE can also monitor the aperiodic TRS for UE receiver or transmitter beam refinement. For example, the base station can inform the UE that it is transmitting A-CSI-RS information to enable the UE to perform beam refinement/tracking procedures at the UE, but in some aspects there may be no need for the UE to report information back to the base station.

In some DCI formats, e.g., DCI format of 0_1, the DCI can trigger the NULL A-CSI report by transmitting a CSI request. A CSI-request value set to zero, may indicate that there is no CSI request for the UE. In other aspects, the base station may request the UE to monitor CSI by setting the CSI-request to a non-zero value.

Figure 7:
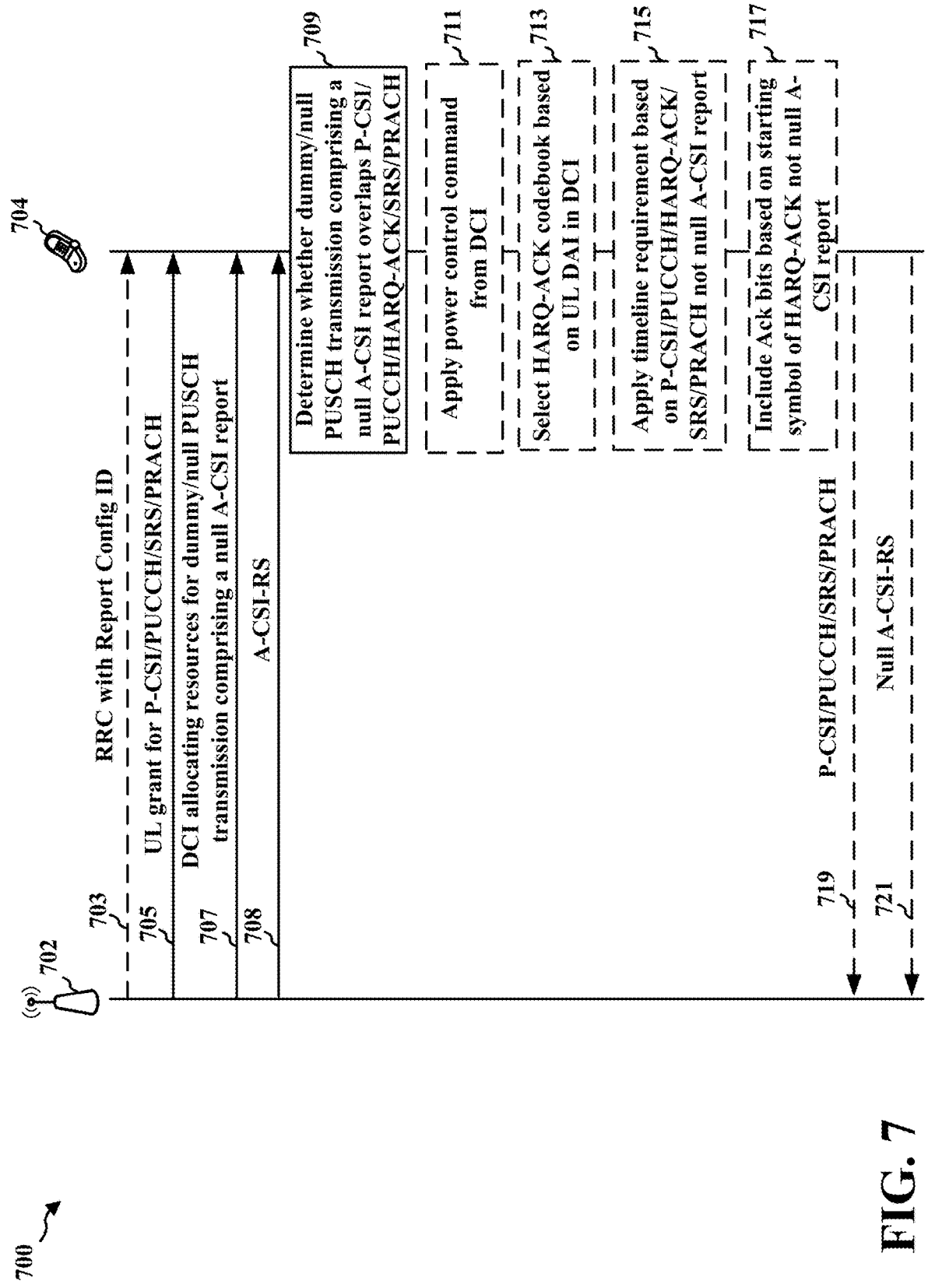
FIG. 7 is a diagram illustrating transmissions between a UE and first and second base stations.

FIG. 7 illustrates an example 700 of a base station 702 triggering A-CSI-RS measurement by a UE 704. At 703, the base station may transmit DCI 707 comprising a CSI request triggering A-CSI-RS monitoring by the UE 704. The base station may then transmit A-CSI-RS 708 to be measured by the UE. The CSI request may trigger the UE to potentially transmit back a CSI report. As mentioned above, if the CSI-request is set to zero, then there may be no request. The base station may request the UE to monitor CSI and provide a CSI report by setting the CSI-request to a non-zero value. The CSI-request can also indicate a CSI-aperiodic Trigger State from a list, e.g., an aperiodic Trigger State List. For instance, the trigger state may come from a list, wherein each state has an associated CSI report configuration with a certain identification. Further, the aperiodic Trigger State List can include an associated report configuration information list, which can include a report configuration identification, e.g., report configuration ID. Likewise, the report configuration ID can include a CSI-report configuration ID with a report quantity. This report quantity can be set to a number of values, e.g., zero or NULL. Essentially, each state can include a quantity that can help to define the state. The present disclosure can include a state when the CSI-request is set to a trigger state and/or when the report quantity may be set to zero or NULL. A number of the fields might be received in a separate message from the DCI.

For instance, a report quantity might not be comprised in the DCI. In some instances, the report quantity can assign resources to send a CSI-report back to the base station. As indicated supra, a NULL value can indicate that there is nothing to report back to the base station. In some aspects, the report quantity can be comprised in a CSI report configuration transmitted by the base station in radio resource control (RRC) 703. The report quantity can essentially instruct the UE to report back a certain quantity that the UE has measured.

The DCI 707 may also allocate PUSCH resources to the UE while the uplink shared channel (UL-SCH) indicator can be set to zero indicating that there is no data required from the UE. Further, a report quantity indicator, e.g., "reportquantity," for the corresponding CSI report can be set to none, which can indicate there is no CSI report. Similarly, the report quantity indicator may assign resources to send a CSI-report back to the base station while having a value that indicates that nothing is required to be reported back to the base station. In this manner, the UE can be asked to monitor the A-CSI-RS, but may not be required to report anything based on the A-CSI-RS. While these aspects are described for the example of A-CSI-RS, aspects may also be applied to TRS. Accordingly, in some aspects, the DCI can reserve resources for data on PUSCH even if there is no data to report or transmit from the UE. In this example, when the UE receives a trigger to measure A-CSI-RS with a report quantity=0 and receives an allocation for PUSCH with UL-SCH=0, the UE may transmit a dummy/null PUSCH transmission comprising a null A-CSI report.

At times, the PUSCH resources allocated for transmission of an A-CSI report may overlap in time with other uplink transmission from the UE. The UE may alter the other uplink transmissions based on the overlap.

Figure 4:
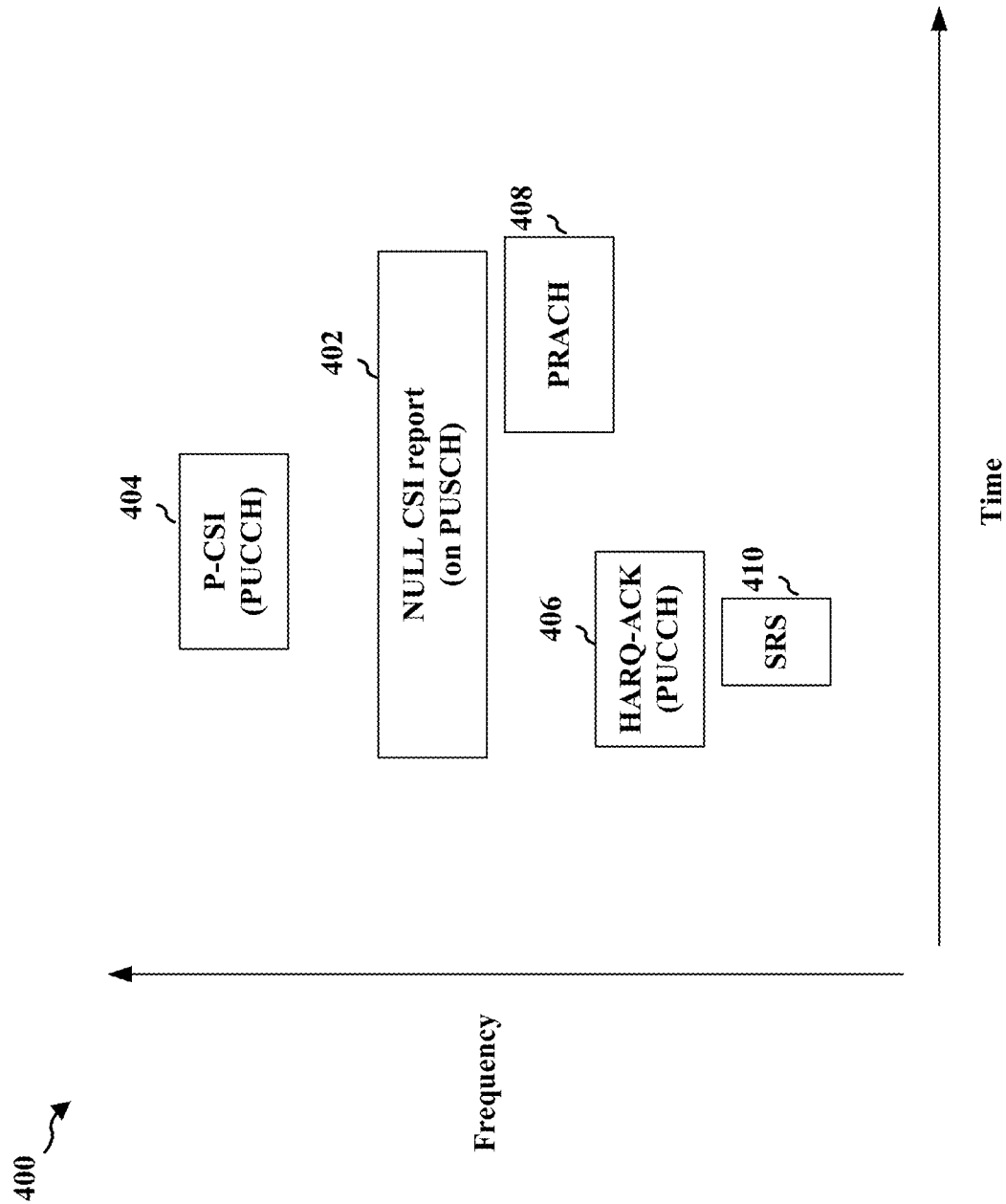
FIG. 4 is a diagram illustrating transmissions overlapping in time in accordance with certain aspects of the present disclosure.

FIG. 4 is a diagram 400 illustrating resources for uplink transmissions that overlap in time in accordance with certain aspects of the present disclosure. The diagram 400 shows an example of the PUSCH resource for the NULL CSI report overlapping with other uplink channels in the time domain. For example, FIG. 4 displays PUSCH resources for the dummy/NULL A-CSI report 402 at least partially overlapping in time with resources for periodic CSI (P-CSI) 404, resources for HARQ-ACK 406 on the PUCCH, resources for PRACH 408, and resources for SRS 410. In the example of FIG. 4, the resources for the NULL A-CSI report 402 may be based on a PUSCH allocation having UL-SCH set to zero, and a A-CSI trigger can be set to a non-zero value while the corresponding report quantity is set to zero or NULL. Essentially, the diagram 400 shows one example of scheduling a dummy PUSCH. Even when the PUSCH resources that overlap with other uplink channels are for a dummy/null PUSCH, there can be a number of rules that may be applied for the uplink transmission.

In some aspects of the present disclosure including overlapping resources, for example as in FIG. 4, certain resources can be assigned different priorities than other resources. For instance, when P-CSI and A-CSI overlap, the P-CSI can be dropped because the overlapping A-CSI report can have a higher priority. This can even be the case in instances wherein the UE may transmit a dummy/null PUSCH transmission comprising a null A-CSI report. As the P-CSI report includes a lower priority compared to the A-CSI report, it may get dropped. However, in some aspects this can be problematic because the P-CSI should not get dropped for a dummy/null PUSCH transmission comprising a null A-CSI report. In other aspects, the HARQ-ACK can be multiplexed or piggybacked on the PUSCH resources assigned for CSI report. However, in some aspects, the HARQ-ACK should not be multiplexed on the PUSCH because it may result in an extremely low coding rate for HARQ-ACK. As mentioned above, this can occur even when the A-CSI report includes a dummy value. Further, the SRS can be dropped because the PUSCH carries a higher priority. Each of these circumstances that include dropped resources can arise because the base station requests the UE to monitor an A-CSI-RS and provides a PUSCH allocation when no data is required from the UE and no CSI report is required from the UE.

In order to address these problems, the UE may determine whether to alter another uplink transmission and/or whether to transmit a dummy/null PUSCH based on whether the allocation of PUSCH resources overlaps in time with another uplink transmission, e.g., at 709. The other uplink transmission may be based on an uplink grant 705 received from the base station. If there is no overlap in time with another uplink transmission, then the UE can transmit the null CSI report, e.g., at 721. If there is an overlap, the UE may refrain from transmitting the null CSI report and/or refrain from altering the other uplink transmission, at 719.

In order to offset any potential complications resulting from overlapping transmissions, the present disclosure can provide a number of different proposals. for instance, in one aspect the present disclosure may refrain from transmitting the PUSCH if it contains a dummy or NULL value. The UE might determine not to alter other uplink transmissions based on a dummy PUSCH. By doing so, the UE can disregard, at least a portion of, the PUSCH allocation as a result of overlapping transmissions. Accordingly, the UE may disregard an allocation dummy PUSCH when the resources overlap in time with certain other uplink transmissions. In these instances, other uplink channels, e.g., PUCCH, SRS, PRACH, may be transmitted, e.g., in their originally assigned resources.

Thus, in the example in FIG. 4, the UE may determine not to drop P-CSI and may transmit an unaltered P-CSI 404 on PUCCH and may refrain from transmitting the dummy/NULL A-CSI report 402. Similarly, the UE may determine to transmit SRS 410 and/or PRACH 408 and may refrain from transmitting the dummy/NULL A-CSI report 402. The UE may determine to transmit HARQ-ACK 406 on PUCCH rather than piggybacking the HARQ-ACK on PUSCH and may refrain from transmitting the dummy/NULL A-CSI report 402.

In other aspects of the present disclosure, the UE may still honor at least a portion of the content in the DCI while disregarding the PUSCH allocation for the dummy/null PUSCH transmission comprising a null A-CSI report.

The DCI 707 may include a transmit power control (TPC) that can control the increase or decrease in transmit power for uplink transmissions from the UE. The TPC can inform the UE at what power it should be transmitting. In an example, the UE can accumulate uplink power, at 711, following the power control command comprised in the DCI 707. The power control command from the DCI 707 allocating resources for the dummy/null PUSCH may be applied to the other uplink transmission, e.g., to the P-CSI/PRACH/SRS/HARQ-ACK.

Further, the DCI 707 may carry a downlink assignment index (DAI), which can accumulate the number of PDSCH acknowledgements (ACKs). For instance, the UE may transmit the PDSCH ACKs back to the base station in a future PUCCH. Accordingly, the DAI can keep track of future ACKs. In some aspects, the UE may follow the uplink DAI in the DCI 707 for transmitting the HARQ-ACK 406 on PUCCH, e.g., at 713 When the HARQ-ACK is transmitted in a PUCCH resource, e.g., when it is not multiplexed on PUSCH, the HARQ-ACK codebook determination can follow the downlink DAI in the downlink grant scheduling the corresponding PDSCH. As presented herein, the UE may instead use the DAI field in the uplink grant for the dummy/null PUSCH. In these instances, the HARQ-ACK codebook determination may follow the uplink DAI in the UL grant from DCI 707. The use of the UL DAI from the DCI 707 for the transmission of HARQ-ACK can provide further information for the base station to determine a proper DAI value. The DAI may be updated, but conveyed to the UE on the downlink DCI. By using the DAI field in the uplink DCI, may inform the base station of an ambiguity between the base station and UE for the codebook size. In some aspects, if the DAI counter between the base station and the UE misses a downlink grant, then in future transmissions the present disclosure can help the UE to recover and maintain the proper counter. Further, if the uplink DAI field is reused to reinforce a downlink DAI, then the present disclosure can mitigate scenarios wherein the UE may have missed certain downlink grants. In some aspects, following uplink DAI can provide an advantage by illuminating the ambiguity between the base station and UE on the HARQ-ACK codebook size, e.g., in case the last downlink grant may be missing.

As mentioned supra, the present disclosure can deal with a dummy or NULL value for a CSI report in a number of different manners. For instance, in some aspects the present disclosure can ignore the scheduled dummy/null PUSCH transmission. Additionally, the UE can continue to use the UL DAI field from the DCI scheduling the dummy/null PUSCH when transmitting another uplink transmission, e.g., HARQ-ACK. As such, the present disclosure can disregard certain portions of the DCI, e.g., the PUSCH allocation that informs the UE to transmit the dummy/null PUSCH transmission comprising a NULL A-CSI report, yet still following other portions, e.g., factor in the DAI field and/or the TPC when transmitting other uplink transmissions.

The UE may also adjust timing when the PUSCH resources for the dummy/null PUSCH overlap in time with another uplink transmission.

Figure 5:
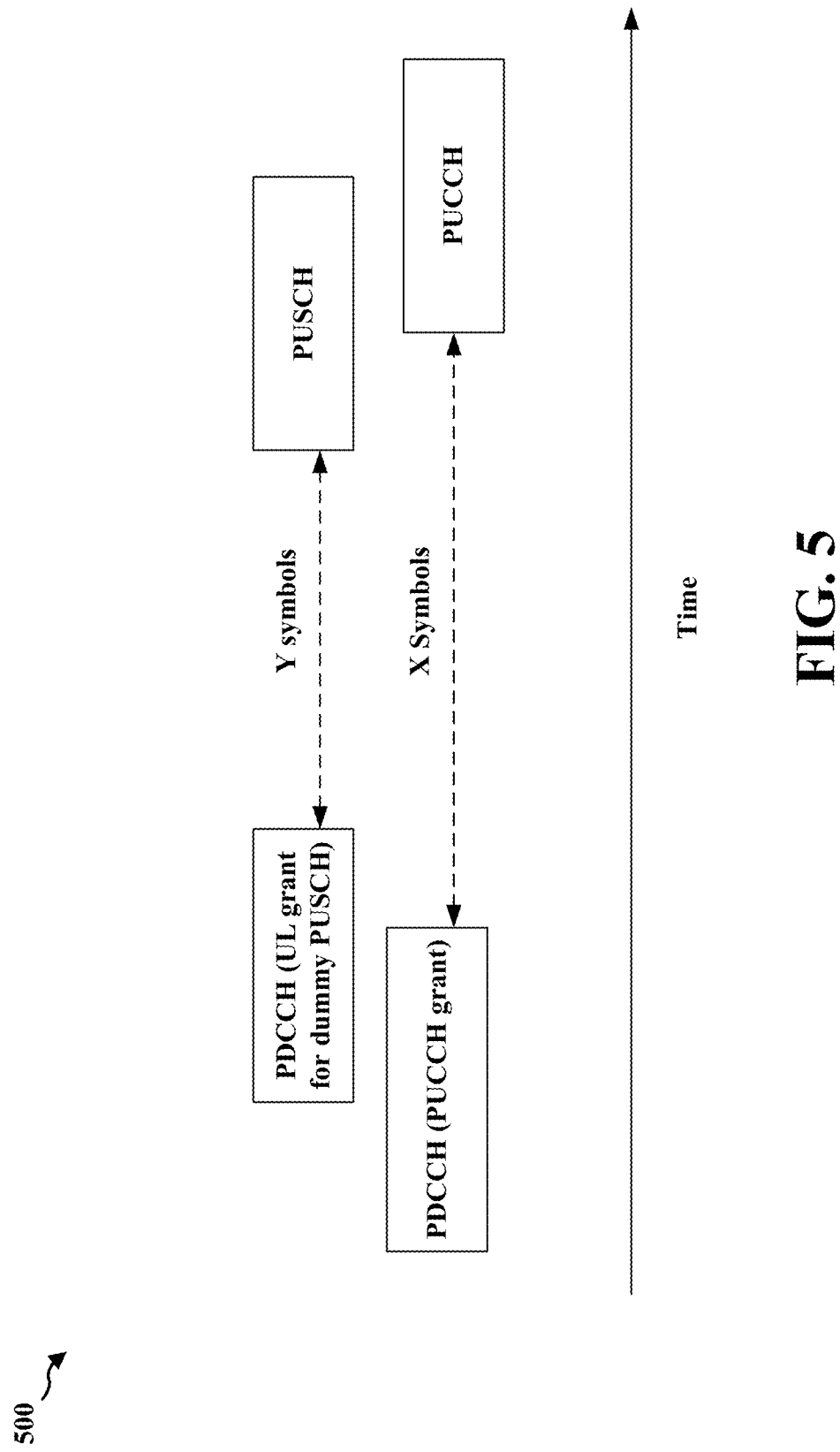
FIG. 5 is a timing diagram illustrating transmissions in accordance with certain aspects of the present disclosure.

FIG. 5 is a timing diagram 500 illustrating transmissions in accordance with certain aspects of the present disclosure. A UE may check whether there is enough time to prepare or modify specific uplink transmissions. For instance, a PUCCH may be begin at least X symbols after the reception of a downlink grant, that schedules the PUCCH. Further, the PUSCH can be at least Y symbols after the reception of an uplink grant that schedules the PUSCH. FIG. 5 displays a timing relation of certain transmissions, e.g., PDCCH in the uplink DCI, PUSCH, PDCCH in the PUCCH grant, and PUCCH. In the case of UCI, e.g., HARQ-ACK, scheduling request (SR), and/or CQI, being multiplexed or piggybacked on a PUSCH, the UE may need to confirm that the earliest starting PUCCH or PUSCH is both X symbols from the PUCCH grant and Y symbols from the PUSCH grant. Essentially, FIG. 5 displays that the present disclosure may include a gap between certain transmissions.

As explained supra, when UEs according to the present disclosure realize there is a dummy PUSCH, and the UE does not need to perform any actions based on the PUSCH being a dummy value, then the UE may suspend certain timeline requirements related to the PUSCH allocation and attempt to send certain transmission, e.g., the PUCCH, based on the parameters associated with the timeline for the PUCCH. Further, the present disclosure may alter certain timelines once a UE realizes the PUSCH contains a dummy or NULL value. In the example in FIG. 5, the UE may need to determine that the PUCCH grant is at least X symbols from the starting symbol of the PUCCH transmission, without regard to the spacing from the starting symbol of the PUSCH allocation, e.g., at 715.

During instances wherein the NULL A-CSI report is transmitted on the PUSCH without an UL-SCH, the UE may suspend a PUSCH-based timeline rule.

In some aspects, before a PUSCH is scheduled, a subsequent PUCCH transmission may carry a number of acknowledgement (ACK) or negative ACK (NACK) bits. In these aspects, there may be certain procedures than govern when the last downlink grant arrives before a PUCCH is transmitted. For instance, the additional ACK or NACK may need to arrive at least a certain amount of time before a starting symbol of the HARQ-ACK transmission on PUCCH. If the additional ACK/NACK arrives before a certain point, then it may be accommodated in the HARQ-ACK transmission on PUCCH. When a dummy/null PUSCH transmission comprising a null A-CSI report is scheduled, the UE may accommodate additional ACK/NACK scheduled a certain amount of time prior to the starting symbol of the PUSCH allocation and may be limited after the UL grant for the PUSCH. As presented herein, the UE may alter certain timeline requirements when a dummy PUSCH overlaps in time with a HARQ-ACK. When a dummy PUSCH overlaps in time with a HARQ-ACK, the UE may allow additional ACK or NACK bits to be scheduled after the reception of the uplink grant for the dummy PUSCH and may instead apply a timeline restriction for additional ACK/NACK based on a starting symbol of the PUCCH transmission of the HARQ-ACK.

Figure 6:
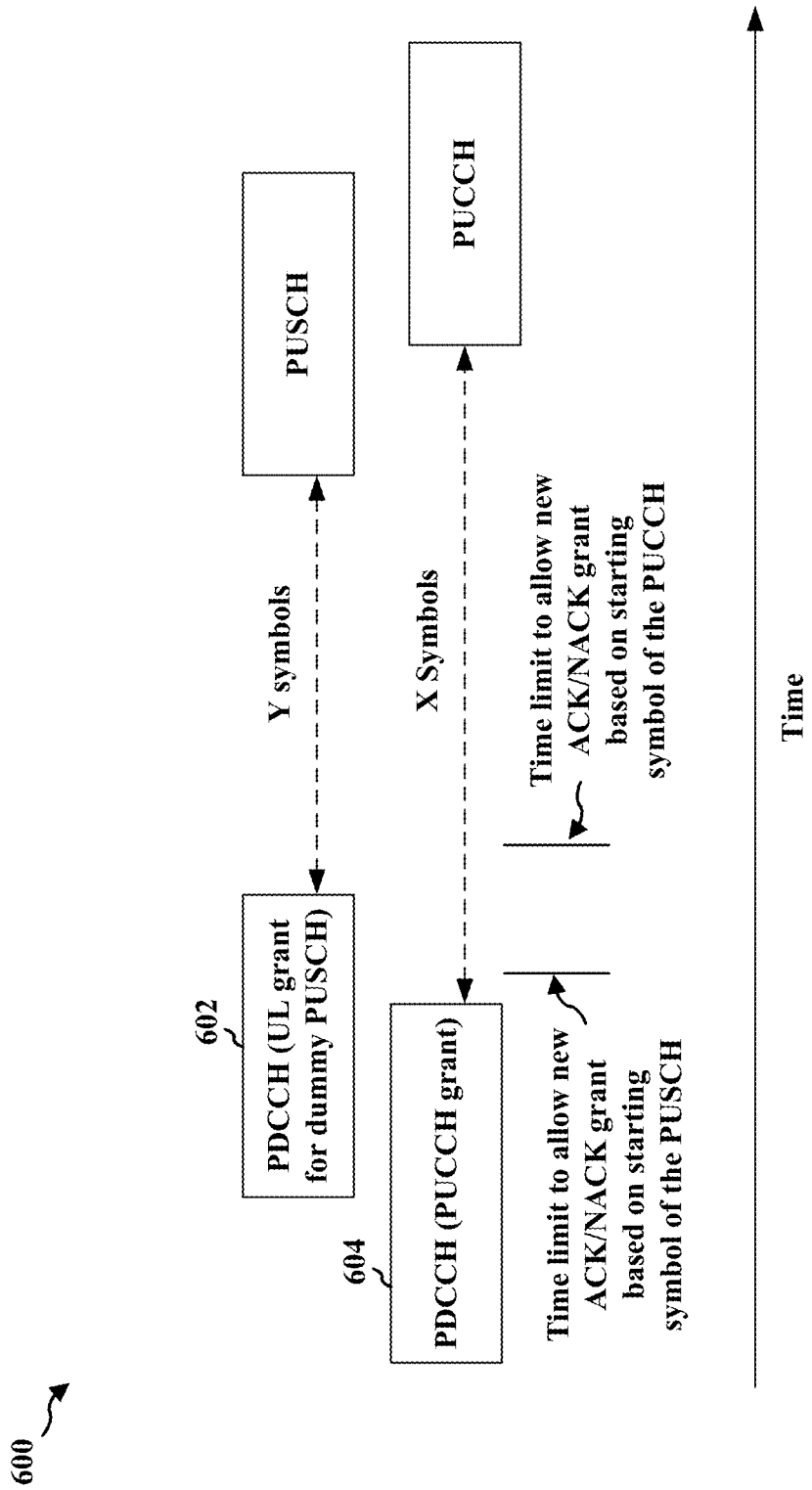
FIG. 6 is a timing diagram illustrating transmissions in accordance with certain aspects of the present disclosure.

FIG. 6 is a timing diagram 600 illustrating transmissions in accordance with certain aspects of the present disclosure. More specifically, FIG. 6 displays one example of whether an ACK or NACK may be allowed to be scheduled after the uplink grant that schedules the PUSCH. For instance, if there are additional ACK or NACK bits scheduled after the uplink grant 602 that triggers the dummy/null PUSCH transmission comprising the null A-CSI report, then the UE may follow the latest downlink grant to determine a number of different values. For example, the UE may follow the latest downlink grant to determine the DAI, e.g., the number of ACK or NACK bits, and/or the ACK/NACK resource indicator (ARI), e.g., a PUCCH resource. In some aspects, the present disclosure can maintain the original ACK or NACK cutoff time, e.g., from PUCCH grant 604, and should not be reset based on the uplink grant 602 being determined to schedule a dummy PUSCH. In other aspects, the present disclosure can allow new ACK or NACK grants after the cutoff time based on the uplink grant 602 once it is discovered that the PUSCH is a dummy. FIG. 6 displays that the time limit can be based on the starting symbol of the PUCCH, e.g., at 717, rather than the starting symbol of the PUSCH.

In some aspects, upon detection of a DCI format, e.g., a DCI format with an uplink shared channel (UL-SCH) indicator set to a zero value and with a non-zero CSI request where an associated report quantity in a CSI report configuration is set to none for all CSI report(s) triggered by the CSI request in this DCI format, the UE may ignore all fields in the DCI except the CSI request and the UE may not transmit the corresponding PUSCH as indicated by the DCI format.

Figure 8:
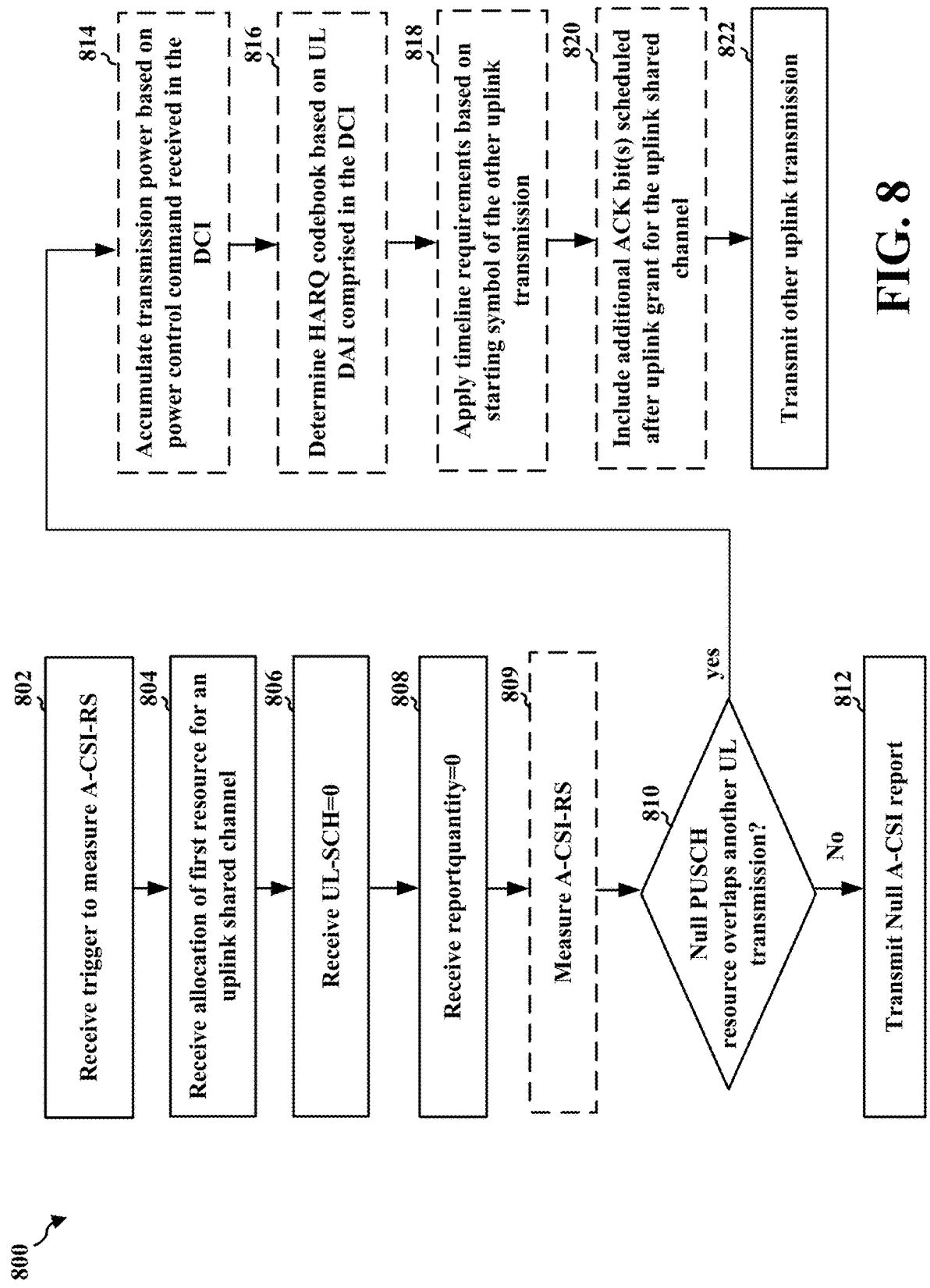
FIG. 8 is a flowchart of a method of wireless communication.

FIG. 8 is a flowchart 800 of a method of wireless communication. The method may be performed by a UE or a component of a UE (e.g., UE 104, 350, 704, the apparatus 1002, processing system 1114, which may include the memory 360 and which may be the entire UE or a component of the UE, such as the TX processor 368, the RX processor 356, and/or the controller/processor 359). Optional aspects are illustrated with a dashed line. The methods described herein may enable a UE to address problems that may arise when resources are allocated for a null/dummy PUSCH that overlap other uplink transmissions. Also, the methods described herein can provide a number of benefits, such as improving communication signaling, resource utilization, and/or power savings.

At 802, the UE can receive a trigger to measure an A-CSI-RS. The trigger may be comprised, e.g., in DCI, such as 707. For example, A-CSI-RS measurement component 1008 of apparatus 1002 may receive a trigger to measure an A-CSI-RS. For example, the trigger may indicate for the UE to monitor the A-CSI-RS for functions performed at the UE, such as for P3 beam refinement or transmit beam refinement assuming channel reciprocity. In another example, the trigger may indicate for the UE to monitor an aperiodic TRS for a downlink tracking loop or receiver/transmitter beam refinement. The UE may measure the A-CSI-RS, e.g., at 809, according to the trigger received at 802.

At 804, the UE can receive an allocation of a first resource for an uplink shared channel (e.g., PUSCH). For example, PUSCH component 1010 of apparatus 1002 may receive an allocation of a first resource for an uplink shared channel (e.g., PUSCH). The allocation of resource(s) for PUSCH may be received in DCI, e.g., 707. Along with the allocation of resource(s) for PUSCH, the UE may also receive a first indication that no uplink data transmission is requested from the UE, at 806. For example, an UL-SCH indicator may indicate that there is no uplink data that the UE needs to transmit. The UL-SCH indicator may be comprised in DCI, e.g., 707.

At 808, the UE can receive a second indication for a null A-CSI report. For example, second indication component 1014 of apparatus 1002 may receive a second indication for a null A-CSI report. The second indication may indicate that no A-CSI report is required from the UE, e.g., after the UE measures the A-CSI-RS at 809. For example, A-CSI-RS measurement component 1008 of apparatus 1002 may measure the A-CSI-RS. The second indication may comprise a report quantity for the CSI having a zero value, e.g., reportquantity=0, indicating that no CSI report is required from the UE. The report quantity information may be received, e.g., in RRC signaling 703. For example, the report quantity may be comprised in CSI report configuration information received in RRC signaling, the CSI report configuration information being referenced in the DCI that triggers measurement of the A-CSI-RS.

At 810, the UE can determine whether to alter another uplink transmission based, at least in part, on whether the first resource allocated for the uplink shared channel overlaps in time with a second resource for the other uplink transmission from the UE in time. For example, determination component 1016 of apparatus 1002 may determine whether to alter another uplink transmission based, at least in part, on whether the first resource allocated for the uplink shared channel overlaps in time with a second resource for the other uplink transmission from the UE in time. As described in connection with FIG. 4, resources for PUSCH that will be used for A-CSI report may overlap in time with resources for other uplink transmissions, such as a P-CSI report, PRACH, SRS, and/or HARQ-ACK. When the UE sends an A-CSI report, the UE may alter the other uplink transmission(s). In one example, UE may drop a P-CSI report, a PRACH, and/or an SRS. In another example, the UE may piggyback/multiplex the HARQ-ACK on the PUSCH resources for transmitting the A-CSI report. However, when the UE has received the first indication, e.g., UL-SCH=0, and the second indication, e.g., report quantity=0, the UE will be transmitting a null PUSCH comprising a null A-CSI report. Thus, at 810, the UE may determine whether or not to alter the other uplink transmission(s) based on whether the resources for the null PUSCH transmission overlap the other uplink transmission(s).

At 812, the UE may transmit a null A-CSI report in the uplink shared channel resource, if the first resource for the uplink shared channel, allocated to the UE at 804, do not overlap in time with the other uplink transmissions. For example, transmission component 1006 of apparatus 1002 may transmit a null A-CSI report in the uplink shared channel resource. However, if the first resource for the uplink shared channel, allocated to the UE at 804, does overlap in time with the other uplink transmissions, the UE transmits the other uplink transmission at 814, e.g., in an unaltered manner. If the first resource allocated for the uplink shared channel overlaps the second resource for the other uplink transmission from the UE in time, the UE may disregard the first resource allocated for the uplink shared channel.

The determination at 810 may be based on a determination for a number of different uplink transmissions.

Figure 9:
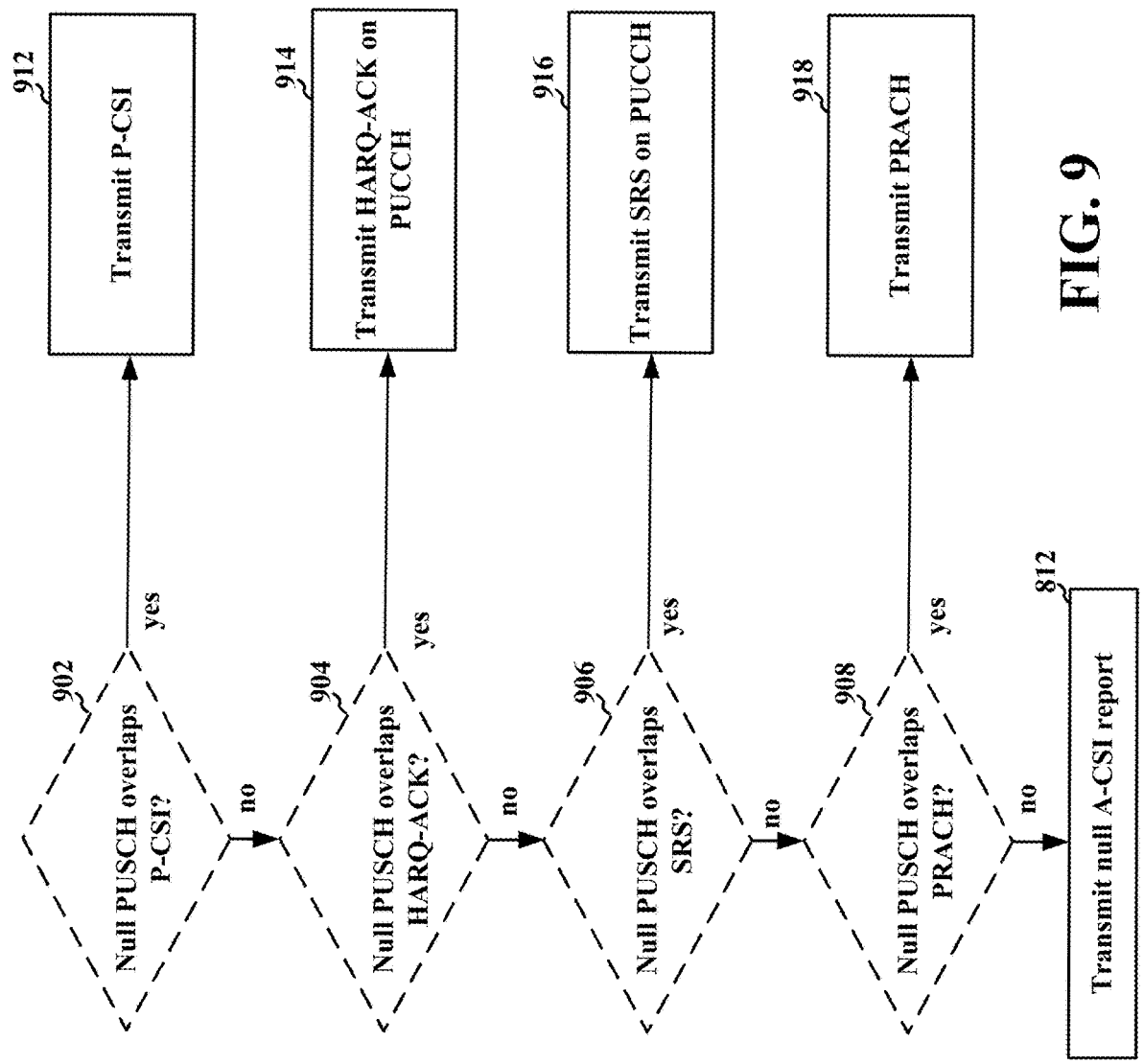
FIG. 9 is a flowchart of a method of wireless communication.

FIG. 9 illustrates examples of different determinations that may be comprised in the determination at 810 in FIG. 8. At 902, the UE may determine whether the first resource allocated for the uplink shared channel overlaps in time with the second resource for a P-CSI report. For example, determination component 1016 of apparatus 1002 may determine whether the first resource allocated for the uplink shared channel overlaps in time with the second resource for a P-CSI report. If so, the UE can transmit an unaltered P-CSI report, at 912. For example, transmission component 1006 of apparatus 1002 may transmit an unaltered P-CSI report.

At 904, the UE may determine whether the first resource allocated for the uplink shared channel overlaps in time with the second resource for HARQ feedback, e.g., HARQ-ACK. For example, determination component 1016 of apparatus 1002 may determine whether the first resource allocated for the uplink shared channel overlaps in time with the second resource for HARQ feedback, e.g., HARQ-ACK. If so, the UE transmits an unaltered HARQ feedback on a control channel (e.g., PUCCH) at 914. For example, transmission component 1006 of apparatus 1002 may transmit an unaltered HARQ feedback on a control channel (e.g., PUCCH).

At 906, the UE may determine whether the first resource allocated for the uplink shared channel overlaps in time with the second resource for an SRS. For example, determination component 1016 of apparatus 1002 may determine whether the first resource allocated for the uplink shared channel overlaps in time with the second resource for an SRS. If so, the UE transmits an unaltered SRS at 916. For example, transmission component 1006 of apparatus 1002 may transmit an unaltered SRS.

At 908, the UE may determine whether the first resource allocated for the uplink shared channel overlaps in time with the second resource for a PRACH. For example, determination component 1016 of apparatus 1002 may determine whether the first resource allocated for the uplink shared channel overlaps in time with the second resource for a PRACH. If so, the UE transmits an unaltered PRACH at 918. For example, transmission component 1006 of apparatus 1002 may transmit an unaltered PRACH. If the UE determines that P-CSI/SRS/PRACH/HARQ-ACK do not overlap in time with the PUSCH resource(s), the UE may transmit the null A-CSI report at 812, as in FIG. 8.

The trigger to measure the A-CSI-RS, e.g., that triggers a dummy/null PUSCH transmission comprising a null A-CSI report, may be received in DCI. Even when the PUSCH resource(s) overlap in time with another uplink transmission so that the UE disregards the allocation of PUSCH resources for the null PUSCH transmission, the UE may still consider other portions of the DCI. For example, the UE may accumulate an uplink transmission power based on a power control command received in the DCI, at 822. As another example, when the other transmission that overlaps the PUSCH resource(s) is HARQ feedback, the UE may determine a HARQ codebook for the HARQ feedback, at 816, based on an uplink DAI in the uplink grant for the PUSCH comprised in the DCI rather than determining the HARQ codebook based on downlink DAI.

The UE may also apply different timeline parameters, such as timeline requirements, based on whether or not a resources for a null PUSCH transmission overlap in time with the other uplink transmission(s). For example, at 818, the UE may apply a timeline requirement for the other uplink transmission based on a first starting symbol of the other uplink transmission and disregard a second starting symbol of the first resource allocated for the uplink shared channel. When UCI will be piggybacked on the PUSCH, a UE may need to apply a timeline requirement for a PUCCH grant based on a starting symbol of the PUCCH and for a PUSCH grant based on the starting symbol of the PUSCH. However, if the UE has determined to transmit the UCI on the control channel rather than piggybacking on a dummy/null PUSCH transmission comprising a null A-CSI report, the UE may disregard timeline requirements for the PUSCH, e.g., the starting symbol of the PUSCH, and may instead apply the timeline requirements based on the starting symbol of the PUCCH. As another example, at 820, when the other uplink transmission comprises HARQ feedback, the UE may include at least one additional ACK bit in the HARQ feedback on an uplink control channel, wherein the at least one additional ACK bit is scheduled after an uplink grant for the first resource allocated for the uplink shared channel. Thus, the timing requirement for including the at least one additional ACK bit may be based on a first starting symbol of the uplink control channel carrying the HARQ feedback and disregarding a second starting symbol of the first resource allocated for the uplink shared channel.

Figure 10:
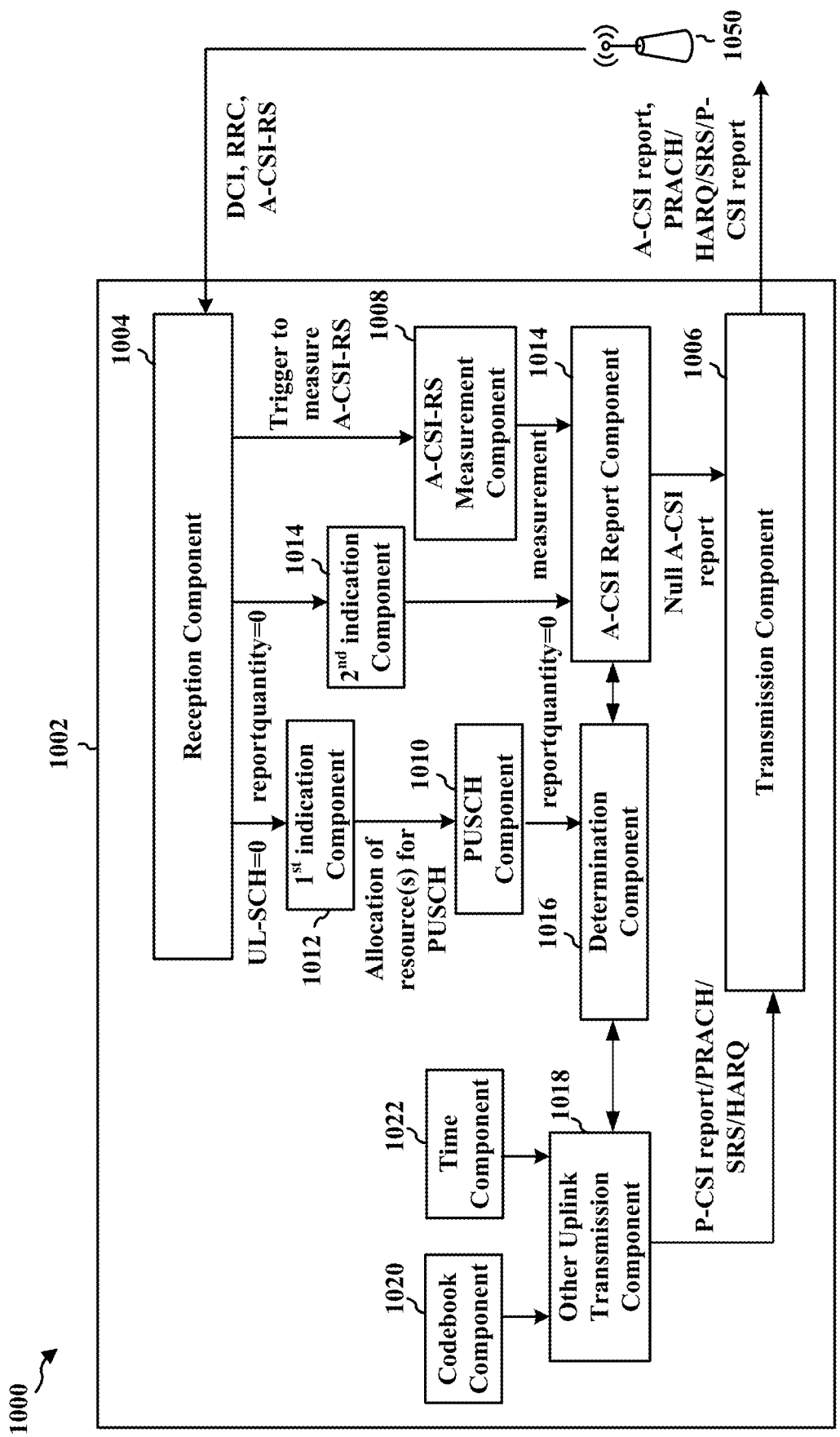
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE (e.g., UE 104, 350, 704) communicating with a base station 1050 (e.g., base station 102, 180, 310, 702). The apparatus includes a reception component 1004 that receives downlink communication from the base station 1050 and a transmission component 1006 that transmits uplink communication to the base station. The apparatus includes a A-CSI-RS measurement component 1008 configured to receive a trigger to measure an A-CSI-RS, e.g., as described in connection with step 802 above. The apparatus includes a PUSCH component 1010 configured to receive an allocation of a first resource for an uplink shared channel, e.g., as described in connection with step 804 above. The apparatus includes a first indication component 1012 configured to receive a first indication that no uplink data transmission is requested from the UE, e.g., as described in connection with step 806 above.

The apparatus includes a second indication component 1014 configured to receive a second indication for a null A-CSI report, e.g., as described in connection with step 808 above.

The apparatus includes a determination component 1016 configured to determine whether to alter another uplink transmission based, at least in part, on whether the first resource allocated for the uplink shared channel overlaps in time with a second resource for the other uplink transmission from the UE in time, e.g., as described in connection with steps 810, 902, 904, 906, 908 above.

The apparatus includes other uplink transmission component 1018 configured to transmit the other uplink transmission and disregarding the first resource allocated for the uplink shared channel the UE disregards the first resource allocated for the uplink shared channel, if the first resource allocated for the uplink shared channel overlaps the second resource for the other uplink transmission from the UE in time, e.g., as described in connection with step 822 above.

If the determination component determines that there is no overlap in time, the A-CSI-report component may transmit a dummy/null PUSCH transmission comprising a null A-CSI report on the allocated PUSCH resource.

The apparatus includes a codebook component 1020 configured to determine a HARQ codebook for the HARQ feedback based on an uplink DAI in an uplink grant comprised in the DCI, e.g., as described in connection with step 818 above.

The apparatus includes a time component 1022 configured to apply a timing requirement based on the other uplink transmission, such as including at least one additional ACK bit in the HARQ feedback on an uplink control channel, wherein the at least one additional ACK bit is scheduled after an uplink grant for the first resource allocated for the uplink shared channel, e.g., as described in connection with steps 820, 822 above.

The apparatus may include additional components that perform each of the blocks of the algorithm in the aforementioned flowcharts of FIGS. 7, 8, and 9. As such, each block in the aforementioned flowcharts of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
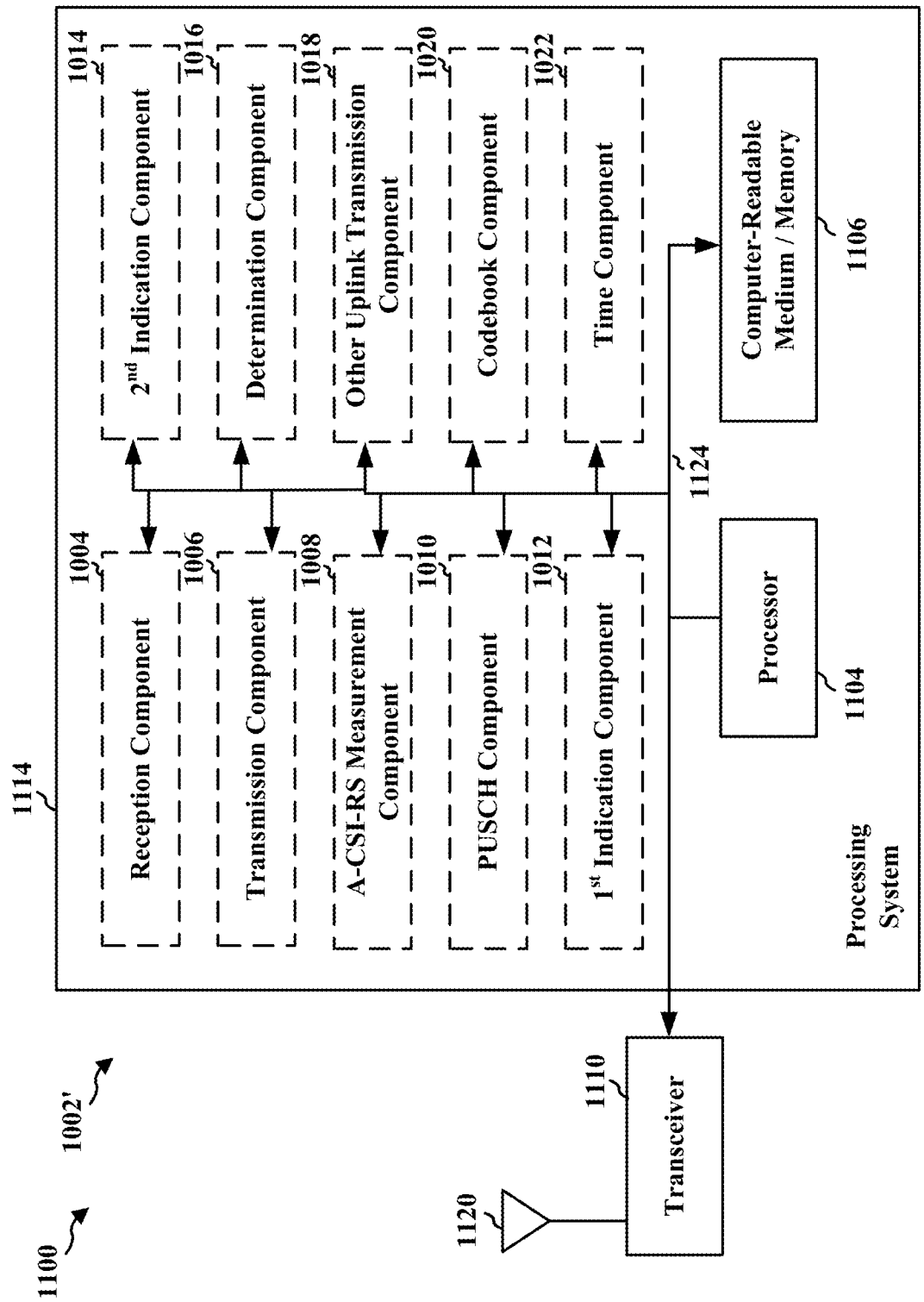
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, 1022. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication can include means for receiving a trigger to measure an A-CSI-RS (e.g., A-CSI-RS measurement component 1008). The apparatus can also include means for receiving an allocation of a first resource for an uplink shared channel (e.g., PUSCH component 1010). The apparatus can also include means for receiving a first indication that no uplink data transmission is requested from the UE (e.g., first indication component 1012). The apparatus can also include means for receiving a second indication for a null A-CSI report (e.g., second indication component 1014). The apparatus can also include means for determining whether to alter another uplink transmission based, at least in part, on whether the first resource allocated for the uplink shared channel overlaps in time with a second resource for the other uplink transmission from the UE in time (e.g., determination component 1016). The apparatus can also include means for transmitting the other uplink transmission and disregarding the first resource allocated for the uplink shared channel the UE disregards the first resource allocated for the uplink shared channel, if the first resource allocated for the uplink shared channel overlaps the second resource for the other uplink transmission from the UE in time (e.g., other uplink transmission component 1018). The apparatus can also include means for determining a HARQ codebook for the HARQ feedback based on an uplink DAI in an uplink grant comprised in the DCI (e.g., codebook component 1020). The apparatus can also include means for including at least one additional ACK bit in the HARQ feedback on an uplink control channel, wherein the at least one additional ACK bit is scheduled after an uplink grant for the first resource allocated for the uplink shared channel (e.g., time component 1022). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving a trigger to measure an Aperiodic Channel State Information Reference Signal (A-CSI-RS);
   receiving an allocation of a first resource for an uplink shared channel;
   receiving a first indication that no uplink data transmission is requested from the UE; and
   receiving a second indication for a null A-CSI report;
   wherein if the first resource allocated for the uplink shared channel overlaps a second resource for other uplink transmission from the UE in time, the UE disregards the first resource allocated for the uplink shared channel, wherein the UE does not transmit the uplink shared channel indicated in downlink control information (DCI);
   wherein the first resource allocated for the uplink shared channel overlaps the second resource for a Hybrid Automatic Repeat Request (HARQ) feedback on an uplink control channel in time, and wherein the UE transmits the HARQ feedback on the uplink control channel, the method further comprising:
   determining a HARQ codebook for the HARQ feedback based on an uplink Downlink Assignment Index (DAI) in an uplink grant comprised in the DCI.

2. The method of claim 1, further comprising:
   determining whether to alter another uplink transmission based, at least in part, on whether the first resource allocated for the uplink shared channel overlaps in time with the second resource for the other uplink transmission from the UE in time.

3. The method of claim 1, wherein if the first resource allocated for the uplink shared channel overlaps the second resource for a Periodic Channel State Information (P-CSI) report in time, the UE transmits an unaltered P-CSI report.

4. The method of claim 1, wherein if the first resource allocated for the uplink shared channel overlaps the second resource for a Physical Random Access Channel (PRACH) in time, the UE transmits an unaltered PRACH.

5. The method of claim 1, wherein if the first resource allocated for the uplink shared channel overlaps the second resource for a Sounding Reference Signal (SRS) in time, the UE transmits an unaltered SRS.

6. The method of claim 1, wherein if the first resource allocated for the uplink shared channel overlaps the second resource for a Hybrid Automatic Repeat Request (HARQ) feedback in time, the UE transmits unaltered HARQ feedback on an uplink control channel.

7. The method of claim 1, wherein the trigger is received in the DCI, and wherein the UE accumulates an uplink transmission power based on a power control command received in the DCI.

8. The method of claim 1, wherein a timeline requirement for the other uplink transmission is based on a first starting symbol of the other uplink transmission and disregarding a second starting symbol of the first resource allocated for the uplink shared channel.

9. The method of claim 1, wherein the other uplink transmission comprises Hybrid Automatic Repeat Request (HARQ) feedback, the method further comprising:
   including at least one additional Acknowledgment (ACK) bit in the HARQ feedback on an uplink control channel, wherein the at least one additional ACK bit is scheduled after an uplink grant for the first resource allocated for the uplink shared channel.

10. The method of claim 9, wherein a timing requirement for including the at least one additional ACK bit is based on a first starting symbol of the uplink control channel carrying the HARQ feedback and disregarding a second starting symbol of the first resource allocated for the uplink shared channel.

11. An apparatus for wireless communication at a User Equipment (UE), comprising:
   a memory; and
   at least one processor coupled to the memory and configured to:
      receive a trigger to measure an Aperiodic Channel State Information Reference Signal (A-CSI-RS);
      receive an allocation of a first resource for an uplink shared channel;
      receive a first indication that no uplink data transmission is requested from the UE; and
      receive a second indication for a null A-CSI report;
      wherein if the first resource allocated for the uplink shared channel overlaps a second resource for other uplink transmission from the UE in time, the UE disregards the first resource allocated for the uplink shared channel, wherein the UE does not transmit the uplink shared channel indicated in downlink control information (DCI);
      wherein the first resource allocated for the uplink shared channel overlaps the second resource for a Hybrid Automatic Repeat Request (HARQ) feedback on an uplink control channel in time, and wherein the UE transmits the HARQ feedback on the uplink control channel, the at least one processor further configured to:
         determine a HARQ codebook for the HARQ feedback based on an uplink Downlink Assignment Index (DAI) in an uplink grant comprised in the DCI.

12. The apparatus of claim 11, the at least one processor further configured to:
determine whether to alter another uplink transmission based, at least in part, on whether the first resource allocated for the uplink shared channel overlaps in time with the second resource for the other uplink transmission from the UE in time.

13. The apparatus of claim 11, wherein if the first resource allocated for the uplink shared channel overlaps the second resource for a Periodic Channel State Information (P-CSI) report in time, the UE transmits an unaltered P-CSI report.

14. The apparatus of claim 11, wherein if the first resource allocated for the uplink shared channel overlaps the second resource for a Physical Random Access Channel (PRACH) in time, the UE transmits an unaltered PRACH.

15. The apparatus of claim 11, wherein if the first resource allocated for the uplink shared channel overlaps the second resource for a Sounding Reference Signal (SRS) in time, the UE transmits an unaltered SRS.

16. The apparatus of claim 11, wherein if the first resource allocated for the uplink shared channel overlaps the second resource for a Hybrid Automatic Repeat Request (HARQ) feedback in time, the UE transmits unaltered HARQ feedback on an uplink control channel.

17. The apparatus of claim 11, wherein the trigger is received in the DCI, and wherein the UE accumulates an uplink transmission power based on a power control command received in the DCI.

18. The apparatus of claim 11, wherein a timeline requirement for the other uplink transmission is based on a first starting symbol of the other uplink transmission and disregarding a second starting symbol of the first resource allocated for the uplink shared channel.

19. The apparatus of claim 11, wherein the other uplink transmission comprises Hybrid Automatic Repeat Request (HARQ) feedback, the at least one processor further configured to:
include at least one additional Acknowledgment (ACK) bit in the HARQ feedback on an uplink control channel, wherein the at least one additional ACK bit is scheduled after an uplink grant for the first resource allocated for the uplink shared channel.

20. The apparatus of claim 19, wherein a timing requirement for including the at least one additional ACK bit is based on a first starting symbol of the uplink control channel carrying the HARQ feedback and disregarding a second starting symbol of the first resource allocated for the uplink shared channel.

21. An apparatus for wireless communication at a User Equipment (UE), comprising:
means for receiving a trigger to measure an Aperiodic Channel State Information Reference Signal (A-CSI-RS);
means for receiving an allocation of a first resource for an uplink shared channel;
means for receiving a first indication that no uplink data transmission is requested from the UE; and
means for receiving a second indication for a null A-CSI report;
wherein if the first resource allocated for the uplink shared channel overlaps a second resource for other uplink transmission from the UE in time, the UE disregards the first resource allocated for the uplink shared channel, wherein the UE does not transmit the uplink shared channel indicated in downlink control information (DCI);

wherein the first resource allocated for the uplink shared channel overlaps the second resource for a Hybrid Automatic Repeat Request (HARQ) feedback on an uplink control channel in time, and wherein the UE transmits the HARQ feedback on the uplink control channel, the apparatus further comprising:
means for determining a HARQ codebook for the HARQ feedback based on an uplink Downlink Assignment Index (DAI) in an uplink grant comprised in the DCI.

22. The apparatus of claim 21, further comprising:
means for determining whether to alter another uplink transmission based, at least in part, on whether the first resource allocated for the uplink shared channel overlaps in time with the second resource for the other uplink transmission from the UE in time.

23. The apparatus of claim 21, wherein if the first resource allocated for the uplink shared channel overlaps the second resource for a Periodic Channel State Information (P-CSI) report in time, the UE transmits an unaltered P-CSI report.

24. The apparatus of claim 21, wherein if the first resource allocated for the uplink shared channel overlaps the second resource for a Physical Random Access Channel (PRACH) in time, the UE transmits an unaltered PRACH.

25. The apparatus of claim 21, wherein if the first resource allocated for the uplink shared channel overlaps the second resource for a Sounding Reference Signal (SRS) in time, the UE transmits an unaltered SRS.

26. The apparatus of claim 21, wherein if the first resource allocated for the uplink shared channel overlaps the second resource for a Hybrid Automatic Repeat Request (HARQ) feedback in time, the UE transmits unaltered HARQ feedback on an uplink control channel.

27. The apparatus of claim 21, wherein the trigger is received in the DCI, and wherein the UE accumulates an uplink transmission power based on a power control command received in the DCI.

28. The apparatus of claim 21, wherein a timeline requirement for the other uplink transmission is based on a first starting symbol of the other uplink transmission and disregarding a second starting symbol of the first resource allocated for the uplink shared channel.

29. The apparatus of claim 21, wherein the other uplink transmission comprises Hybrid Automatic Repeat Request (HARQ) feedback, the apparatus further comprising:
means for including at least one additional Acknowledgment (ACK) bit in the HARQ feedback on an uplink control channel, wherein the at least one additional ACK bit is scheduled after an uplink grant for the first resource allocated for the uplink shared channel.

30. The apparatus of claim 29, wherein a timing requirement for including the at least one additional ACK bit is based on a first starting symbol of the uplink control channel carrying the HARQ feedback and disregarding a second starting symbol of the first resource allocated for the uplink shared channel.

31. A non-transitory computer-readable medium storing computer executable code for wireless communication at a User Equipment (UE), comprising code to:
receive a trigger to measure an Aperiodic Channel State Information Reference Signal (A-CSI-RS);
receive an allocation of a first resource for an uplink shared channel;
receive a first indication that no uplink data transmission is requested from the UE; and
receive a second indication for a null A-CSI report;
wherein if the first resource allocated for the uplink shared channel overlaps a second resource for other uplink transmission from the UE in time, the UE disregards the first resource allocated for the uplink shared channel, wherein the UE does not transmit the uplink shared channel indicated in downlink control information (DCI);

wherein the first resource allocated for the uplink shared channel overlaps the second resource for a Hybrid Automatic Repeat Request (HARQ) feedback on an uplink control channel in time, and wherein the UE transmits the HARQ feedback on the uplink control channel, further comprising code to:

determine a HARQ codebook for the HARQ feedback based on an uplink Downlink Assignment Index (DAI) in an uplink grant comprised in the DCI.

* * * * *